June 14, 1966   H. D. CRANE   3,256,518
THERMOCHROMIC INDICATING SYSTEM
Filed July 27, 1959   2 Sheets-Sheet 1
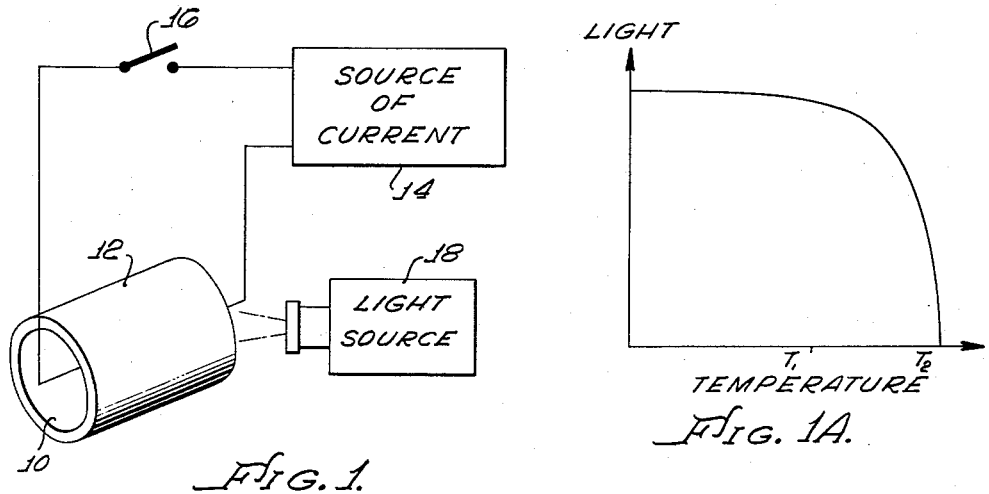
FIG. 1.
FIG. 1A.
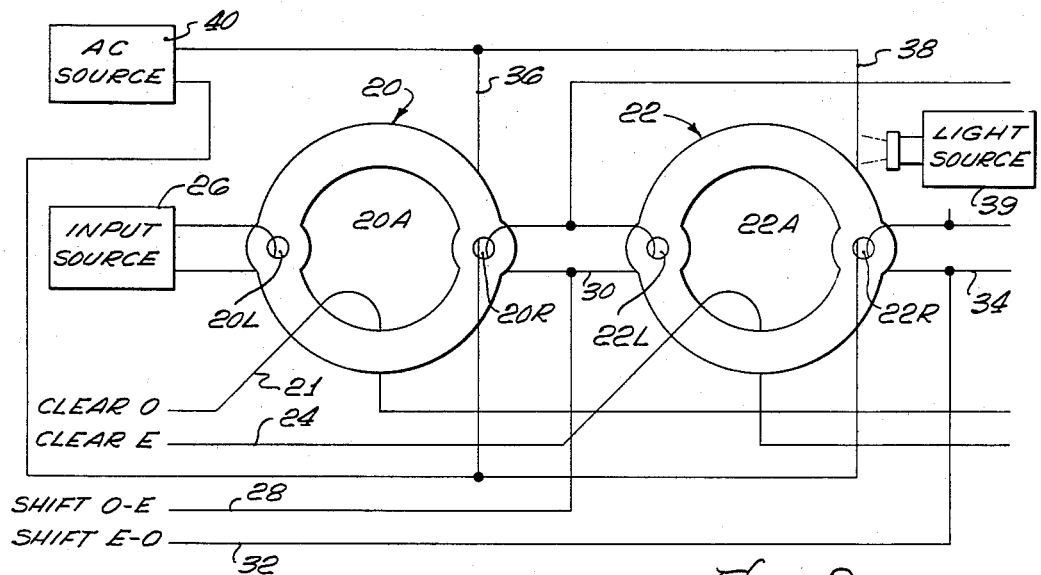
FIG. 2.
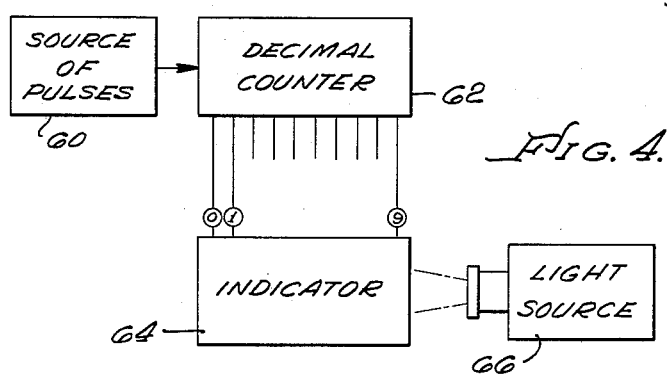
FIG. 4.
INVENTOR.
HEWITT D. CRANE
BY
ATTORNEYS.

United States Patent Office 3,256,518
Patented June 14, 1966

3,256,518
THERMOCHROMIC INDICATING SYSTEM
Hewitt D. Crane, 752 Kendall Ave., Palo Alto, Calif.
Field July 27, 1959, Ser. No. 829,638
4 Claims. (Cl. 340—253)

This invention relates to electrical indicators and, more particularly, to an arrangement for indicating the flow of electrical current through a conductor.

There are a number of materials which have the property that the color of the material changes, or its light-radiating properties can be altered by raising its temperature. These light-radiating properties are restored when the temperature of the material is lowered again. For example, the phosphors have their phosphorescent properties significantly altered by a rise in temeprature. Thus, a phosphor which can fluoresce at room temperature can become almost completely dark when a 100° C. rise occurs. A description of the electroluminescent phosphors which have these properties can be found in a text entitled, "Luminescence of Solids," by Leverenz, published by Wiley. In accordance with this invention, this property of a material, namely, that its light output is a function of its temperature, in combination with a conductive element, may be employed as an indicator of a current flow where a low-power indicating device is required.

The general problem of indication has two important aspects. One is information, and the other is energy. Most presently used indicators incorporate both aspects in the same device. For example, incandescent lamps which in the smallest commercially available types are rated at about 1.2 v. and 60 ma., represents a very significant amount of power when indication is required in low-power information circuits (such as transistor circuits). These indicators, however, have a relatively short life compared with solid-state devices, and they are also very shock sensitive.

Another illustration of an indicator is a neon bulb. These require relatively low power (on the order of 10 milliwatts), but do have the limitation of being a high-voltage device. Furthermore, because of their susceptibility to internal electrode contamination and sensitivity to pressure, they generally have poor long-term stability.

Yet another indicator are electroluminescent indicators. These are generally poor as far as circuits are concerned since they require A.C. excitation. The lowest practical voltage for obtaining electroluminescence which has been reported to date is about 75 volts. These indicators have a large volt-ampere drain, since they operate with a poor power factor.

An object of the present invention is to provide a novel and useful indicator.

Another object of the present invention is to provide an indicator which can operate on relatively low power.

Still another object of the present invention is the provision of a novel indicator which does not require high voltages for operation.

Yet another object of the present invention is the provision of a novel and useful indicator which is inexpensive.

Still another object of the present invention is the provision of an indicator which has a life which may be as long as that of solid-state devices.

These and other objects of the invention are achieved by employing a material having a property that its light reflection or radiation, or reradiation, properties can be changed in response to a change in its temperature from a predetermined value, but are restored when the temperature returns to this predetermined value. The energy for detecting the change in material properties is provided by an external light source. This material is coated on a surface which can conduct electrical current and which has resistive properties such that its temperature increases in response to an electrical current flow therethrough. Thus, one state of light-radiating properties or color may be represented at room-temperature conditions. The second state, or color, is provided at some elevated temperature. Since the color indication is related to a surface, rather than a volume effect, the indicating material may be made very thin. Therefore, the amount of heat required to raise the temperature a certain amount is correspondingly small. Such thermochromic material may be coated on a thin conductive material, and the heat may be obtained by electrical means, either through direct current, or alternating current.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a view in perspective of the invention in its simplest form;

FIGURE 1A is a graph showing the reradiation of a phosphor material plotted against temperature;

FIGURE 2 is a circuit diagram illustrating the invention being employed as an indicator in a bistable-state shift register;

FIGURE 4 is a block diagram of an arrangement for driving the character indicator shown in FIGURE 3.

Figure 3:
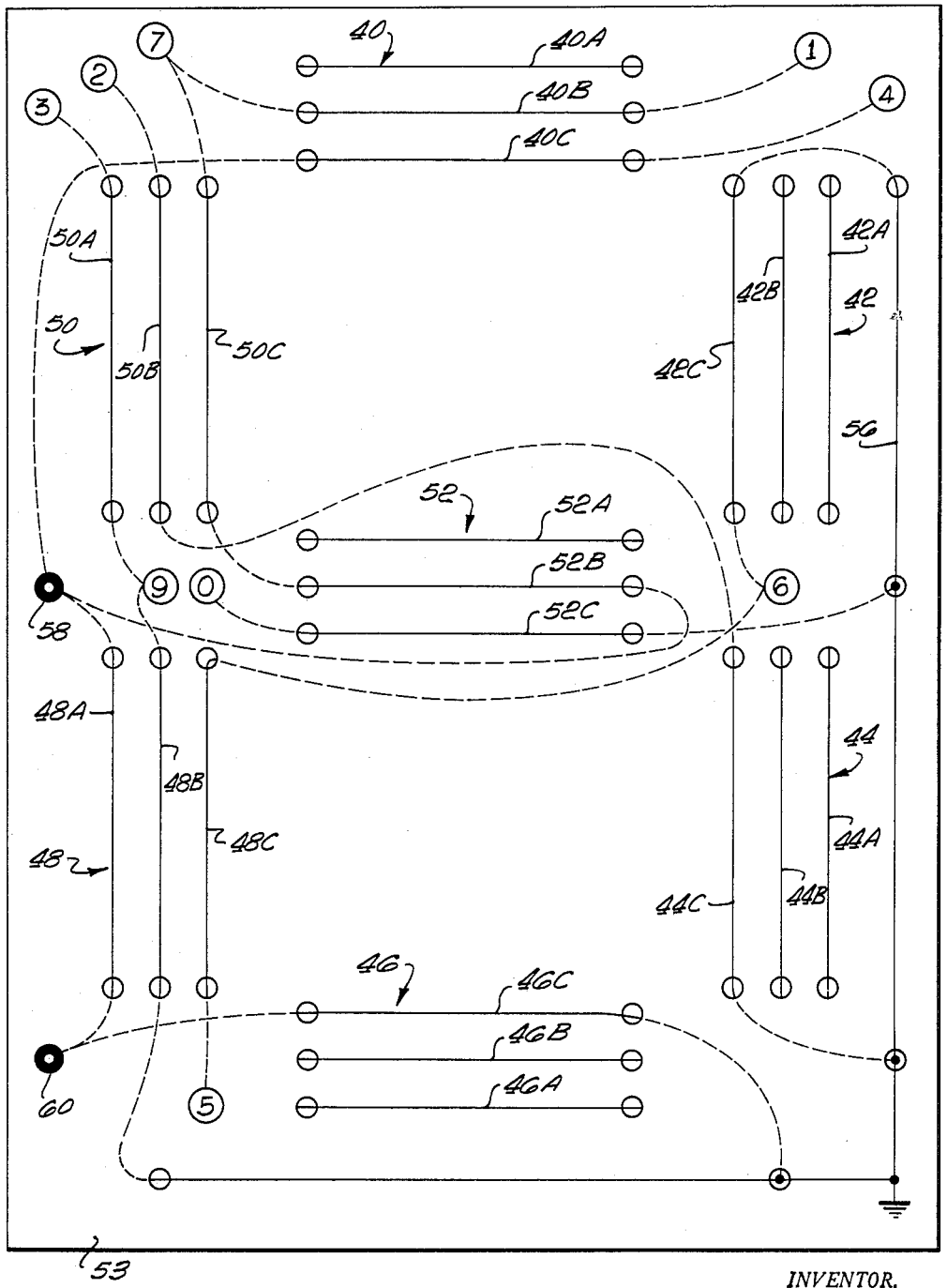
FIGURE 3 is a circuit diagram which illustrates the invention being employed to indicate characters.

Referring now to FIGURE 1, in accordance with this invention a conductor, such as a wire 10, has a coating thereon 12 of a material whose optical properties are thermally sensitive. The conductor has the property that in response to the flow therethrough of an electrical current, the temperature rises. This rise in temperature is communicated to the coating 12, which changes its light-reradiating properties in response thereto. The electrical current is obtained from a source of current 14 whenever the switch 16 is closed. The source can either be direct current or alternating current. Any arrangement whereby the temperature of the wire and thereby the thermochromic material is elevated through the region of light-radiating property change may be employed here. A source of light 18 is provided for providing the illumination whereby the light-reradiating properties of the coating 12 may be observed. This light source may be sunlight, an ordinary light bulb, or an ultraviolet light source, depending on the type of material used for the coating.

Ordinary phosphors are an example of a suitable material for such an application. The reradiated light output from a phosphor, in response to ultraviolet stimulation, is very sensitive to the temperature of the material. Thus, phosphors are available that will glow brightly in response to the UV stimulation at room temperature, but will be completely extinquished at temperatures on the order of 100° C.

Reference is now made to FIGURE 1A, which is a graph showing the reradiation, or light output, of a phosphor material plotted against its temperature. It will be seen that when its temperature exceeds the value of T1, the light output begins to decrease rapidly, and, at T2, its light-radiating properties are completely eliminated. The process is a reversible one, and as soon as the temperature of the material has been returned to T1 its light-radiating properties, or color, appear to be restored in response to UV stimulation.

The ultility of the proposed combination of an electrical conductor with a thermochromic material whose color changes as a result of its temperature change is extremely large, especially in view of the very low energy requirement to effectuate such change. This may be on the order of several milliwatts. Thus, since these appilications will be apparent to those skilled in the art, the illustrations of these applications which are provided herein are to be considered as exemplarly only, and not by way of limitation. For example, indicators of the type shown in FIGURE 1 may be placed in the collector lead of a transistor to indicate a high or a low collector current. In such event, the resistance of the conductor is made extremely low. If desired, a high-impedance indicating element can be obtained by making the conductor have a high resistance. This can be placed in parallel with the collector, to indicate a high or a low collector voltage. This is an illustration of the indicator being used with a direct-current excitation.

FIGURE 2 shows a use of the indicator with an alternating-current excitation. A shift register in a well-known device which employs bistable-state elements in a sequence. Information in the form of binary bits of data are inserted at one end of the shift register and are effectively shifted from binary element to binary element through the shift register. In this manner, a desired short delay, or storage interval, is obtained for the data which has been entered into the shift register. It is oftentimes desirable to be able to visually display the contents of a shaft register. Heretofore, the favored indicators for shift registers were neon bulbs. However, because of the high voltage required for operating these neon bulbs, as well as for other technical reasons, these elements are sometimes difficult to utilize. The present invention, however, because of its simplicity and economy, can be utilized to indicate the state of each bistable-state device in a shift register, and thereby the contents of the shift register. All that it is necessary to do is to have each bistable-state device in the shift register control the current flow through one of the indicators, whereby the light-radiating properties of the indicator show in which state a bistable state device is in.

FIGURE 2 illustrates a circuit diagram for two elements of a shift register of the type presently finding popularity. These are magnetic-core shift registers. More specifically, the arrangement of the magnetic cores exemplified by only two cores is described in detail in an article by H. D. Crane, entitled, "A High-Speed Logic System Using Magnetic Elements and Connecting Wire Only," in the Proceedings of the I.R.E., January 1959, volume 47, pages 63–73.

In view of the explanation of the shift register operation in the above-mentioned article, the details of the operation of the first two stages of the shift register shown in FIGURE 2 will not be gone into here. However, for the purposes of understanding the application of this invention with a shift register, a brief description thereof will be provided. The shift register includes a plurality of toroidal magnetic cores 20, 22, each of which has at least two opposite states of magnetic remanence. For the purposes of this description, one of the states will be termed the "clear" state and the other the "set" state. When a magnetic core is in its clear state, it represents the binary bit "zero"; when in its set state, it represents the binary bit "one." The cores 20, 22, shown in FIGURE 2, are of the type known as multiaperture cores. They have a large, central aperture 20A, 22A, a small left aperture 20L, 22L, which are also known as their "receive" apertures, and a small right aperture 20R, 22R, also known as the "transmit" apertures. The form of the shift register shown in FIGURE 2 requires the use of two magnetic cores for each binary bit of information desired to be stored and shifted.

Initially, all the cores in the shift register are in their clear state. This may be achieved by applying a current first to a winding 21, which is known as the clear-odd-core winding, and then to a winding 24, which is known as the clear-even-core winding. The clear-odd-core winding is inductively coupled to each one of the odd-numbered cores in a sequence in a shift register. It couples to the cores through their main, or central, apertures. Similarly, the clear-even winding 24 is coupled to all the even-numbered cores through their main apertures. The input to the shift register is obtained from an input source of signals 26. In order to drive the core 20 from its clear to its set state, the current which is applied to the aperture 20L must exceed a predetermined threshold value. If such current is not received, it will not be driven to its set state. Thus, a one binary bit may be entered into the magnetic core 20 from the input source. In order to transfer that one from the core 20 to the core 22, a current havin a predetermined value is applied to a shift odd-to-even winding 28. The current will flow through the coil 28 and then split between the halves of a transfer winding 30, which is coupled between the apertures 20R and 22L. The winding 28 is connected, in turn, in the manner shown for winding 30 to all the windings in the shift register which couple a transmit aperture of an odd-numbered core to a receive aperture of an even-numbered core. If the core 20 is in its clear state, then the even division of the current flowing through the coupling coil 30 is such that the current which flows through the aperture 20R does not exceed the threshold value and the core 20 is unaffected and left in its clear state, and the core 22 is also unaffected, since the current through the aperture 22L does not exceed the threshold value. This, effectively, is the same as transferring a zero.

If the core 20 is in its set state, then the threshold for changing flux around the aperture 20R is lower than the current received through the coupling winding 30, and the flux around the aperture 20R will begin to change in direction. This induces a voltage in the coupling winding, which acts to steer the current being received over the winding 28 through the aperture 22L, instead of permitting it to divide evenly in half. This value of current will then exceed the value required to drive the core 22 from its clear to its set condition, and, effectively, a one binary bit is entered into the core 22. Thus, the core 22 is in its set condition. In order to transfer the information in the core 22 to the next even core, current is applied to a shift even-to-odd winding 32. In the same manner as has been described, this winding is connected to each one of the coupling windings 34, which couple a transmit aperture of an even-numbered core to a receive aperture of an odd-numbered core in the shift register. Thereafter, the clear-odd winding 21 is excited in order to clear the odd cores so that they may receive the contents of the even cores, which will next be shifted.

In accordance with this invention, there is inductively coupled to each core in the shift register (or to every other core, if desired, since one bit is present in every two cores) a conductor 36, 38, which has coated thereon a material whose light reradiating properties are changeable with temperature. All the conductors 36, 38 are connected to an alternating-current source 40, which applies a radio frequency current thereto. When a core is in its clear state, then the impedance presented to the flow of current through the indicators 36, 38 is low. This is so because the current in 36 cannot switch any flux about the aperture which is blocked. When the core is driven to its set condition, then flux may be switched about the aperture with low values of current in 36. Thus, a large impedance to current flow is presented in this case. Thus there is a sufficient difference in the amount of current that can flow through the wire, so that the condition of the core, whether in a clear or set condition, can be readily determined. In this case, the indicator elements get hotter for a stored zero than a stored one. A light source 39 provides light, whereby the change in reradiating properties of the indicators 36, 38 with temperature may be seen.

Yet another form of the invention is shown in FIGURE

3. This represents an arrangement for displaying symbols, letters, numbers, or characters of any desired sort. By way of illustration, in FIGURE 3 there is shown an arrangement for producing a numerical display with a 10-wire input. The arrangement shown contains a plurality of groups of wires 40, 42, 44, 46, 48, 50, and 52, which are mounted on a panel 53. The groups of wires are arranged in the form of a block in FIGURE 3. Each group of wires contains three conductors A, B, C, which have the desired resistive properties so that a flow of current therethrough can raise their temperature a sufficient amount to affect the material that is coated over them. This material has light-reradiating properties that change with temperature. The three conductors are electrically insulated from one another and are maintained in sufficiently close proximity to attain substantially identical temperatures. For this reason, only one conductor A in each group need be coated with a thermochromic material. The rise in temperature of any one of the wires in the group will affect the color of the material.

The terminals between which current is applied in order to establish a desired character are respectively marked from one through zero and ground. The ground wire 56 completes the required electrical circuit. These conductors may be plated upon the panel, if desired. The panel is provided with a hole at the ends of each set of the conductors through which wiring can extend for interconnecting the conductors so that when voltage is applied between a desired one of the terminals and the ground wire 56, the wires in the respective groups are connected in series to enable current flow therethrough, which will thereby change the light properties of the conductor groups which form the desired character.

For example, from the terminal marked 1, connection is made through a hole in the panel to the conductor 40B, which is then connected to the terminal 7. From terminal 7, connection is made to conductor 50C, 52B, then to a common junction 58, and thereafter through a conductor 48A through a junction 60, through a conductor 46C, to ground. Thus, conductor groups 42 and 44, which represent the number 1, retain different light properties than the remaining groups. Thus, with appropriate shift in light properties in response to the thermal pattern, the desired character can be detected, when viewed by the illumination obtained from a light source (not shown here).

The application of a current to the terminal marked 2 will extinguish groups 50 and 44. This may be seen by following connection from the terminal 2 through conductor 50B, through conductor 44C, to ground. To represent the number 3, current is applied to terminal 3, and it flows through conductor 50A, through the nine terminal, through conductor 48B, to ground.

The number 4 may be seen by permitting a current flow from terminal 4 through conductor 40C through tie point 58, which will thereafter enable current to flow through conductor 48A to tie point 60, and through conductor 46C to ground.

The number 5 will be seen by applying a current to the terminal marked 5, whereby current will flow through conductor 48C to the terminal 6, and through conductor 42C to ground.

The number 6 may be seen by applying a current to the terminal marked 6. The current will thereafter flow through conductor 42C to ground.

The number 7 may be seen by applying a current to the terminal marked 7, whereby it flows through conductor 50C, conductor 52B, terminal point 58, conductor 48A, terminal point 60, conductor 46C, to ground.

The number 8 is represented when no current is applied to any of the junctions. The number 9 is represented by applying a current to the terminal marked 9, whereby it flows through conductor 48B to ground.

The number 0 is represented by applying a current to the terminal 0, whereby it flows through conductor 25C to ground.

A very simple arrangement for operating the display device is shown in FIGURE 4. A source of pulses 60 applies these pulses to a decimal counter 62. The decimal counter, in response to these pulses, changes its count successively. Each count state of the decimal counter is connected to one of the terminals of an indicator 64 of the type shown in FIGURE 3, which corresponds to the count state of the decimal counter. Thus, the display device will be successively actuated through the numbers 0 through 9, or will show the count state of the counter at all times. A light source 66 provides the required light energization for the indicator 66.

The display device shown in FIGURE 3 is constructed with the same number of wires in each leg, or the same number of wires in each group, in order to equalize the thermal properties. A display constructed in this fashion has the following properties. It is built in a single plane and has no parallax difficulties. It is solid state and has no moving parts, and there are no special limitations on the sizes of the characters. The physical depth of the arrangement is small, since the only room required is that for the interconnection of the wires. By mixing differently colored phosphors having different temperature characteristics, then multicolor displays can be obtained by thermal biasing. For example, if two differently colored phosphors (say blue and yellow), having quenching temperatures $T_a$ and $T_b$ are mixed, then the color of the display is the combined color (green). If, however, all the groups are biased to a temperature $T$, such that $T_a$ is less than $T$, which is less $T_b$, then the display has the color of the phosphor having the higher quench temperature.

Obviously, no special vacuum or atmosphere is required for this invention and, also, relatively low energy is required. By an appropriate choice of materials and geometry, a very wide design range of electrical impedance is possible. This electrical impedance may be linear or nonlinear. For example, by having the impedance itself a nonlinear function of temperature (as in a semiconductor) additional control properties may be achieved, such as increased sensitivities to signals. There is no special requirement upon the source of power, since it is only the heating effect that is desired for obtaining the required display.

The indicator in accordance with this invention may be employed for providing logical functions. For example, in the above circuit arrangements, a logical OR function is obtained by the close thermal contact of the various inputs. In a similar way, a logical AND function may be obtained. Thus, the currents in the wire may be adjusted so that two or more wires need be energized for quenching to occur. For example, in FIGURE 1A, if a single current can only raise the temperature to $T_1$, there is no significant quenching. If two simultaneous currents can raise the temperature to $T_2$, then significant quenching is obtained, and the equivalent of a two-input AND gate is achieved. Depending upon the sharpness of the quenching curve, more inputs may be added to form a three- or four-input AND gate.

By way of example, and not to be construed as a limitation, in some embodiments of the invention which were built and operated, phosphors such as No. 1620, purchaseable from the Du Pont Company, and coated on Manganin wire were used. An ultraviolet light source was used.

There has accordingly been described and shown hereinabove a novel, useful indicating circuit. The indicating circuit employs the reversible characteristic of certain materials, whereby when their temperature is raised their color or radiation properties change, and when their temperature is restored, the radiation properties are restored. These materials may be coated on a conductive material which has the property that when an electrical current flows therethrough, its temperature rises and can attain a sufficient rise to alter the visible properties of the material, whereby an indication is provided that a current is flowing. The device is economical, both from the cost of manufacture, as well as the cost of operation.

I claim:

1. An indicator comprising a plurality of groups of electrically insulated current conductors, each of said conductors having resistive properties such that its temperature increases in response to electrical current flow therethrough, all the conductors in each group being spaced sufficiently close to substantially maintain temperature identity, said plurality of groups of conductors being disposed relative to one another in a substantially block eight arrangement, an indicating material coated on at least one of the conductors in each of said groups, said material having the properties that its light-reradiation properties change responsive to an increase in said conductor temperature above a predetermined value but are restored when said temperature falls below said predetermined value, and means for selectively applying electrical current to a conductor in certain ones of said groups to leave the remaining groups in the form of a desired character with the light-reradiation properties of the coated indicating material unaffected.

2. An indicator as recited in claim 1 wherein said means for selectively applying electrical current to a conductor in certain ones of each group includes a terminal for each desired character, and means for connecting in series to a terminal a conductor in said certain ones of said groups which leave the remaining groups in the form of a desired character.

3. A visual indicator for indicating the condition of a system subject to variation between two given states, said indicator comprising:

a thermochromic member having a given critical temperature at which it reversibly changes from one color below said critical temperature to another color above said critical temperature;

an electric heater thermally coupled to said member; and circuit means for automatically supplying an electric current to said heater that varies in magnitude, as a function of the variations in the condition of said system between said states, between one value that is sufficient to heat said thermochromic member above said critical temperature and another value that heats said thermochromic member below said critical temperature.

4. The invention according to claim 3 wherein said heater includes a resistance wire embedded in said thermochromic member.

References Cited by the Examiner

UNITED STATES PATENTS

| | | | |
|---|---|---|---|
| 1,746,363 | 2/1930 | Schleicher | 340—253 |
| 2,803,812 | 8/1957 | Rajchman et al. | 340—174 |
| 2,904,626 | 9/1959 | Rajchman et al. | 340—174 |
| 2,945,305 | 7/1960 | Strickler | 88—106 |
| 2,945,954 | 7/1960 | Gaugler | 73—356 |

FOREIGN PATENTS

| | | |
|---|---|---|
| 561,984 | 8/1958 | Canada. |
| 138,835 | 2/1920 | Great Britain. |
| 204,499 | 10/1923 | Great Britain. |

OTHER REFERENCES

Crane, "A High-Speed Logic System Using Magnetic Elements and Connecting Wire Only," in Proceedings of the IRE, January 1959, pp. 63–73.

Publication I: Rajchman, Briggs and Lo, Proceedings of the IRE, November 1958, Transfluxor Controlled Electroluminescent Display Panels, pp. 1808–1824, Publication 6.

NEIL C. READ, *Primary Examiner.*

E. R. REYNOLDS, JOHN BURNS, *Examiners.*

J. W. DORITY, L. S. GRODBERG, R. M. ANGUS,
*Assistant Examiners.*